Feb. 20, 1951     W. J. TURNBULL     2,542,847
LOADING AND UNLOADING PLATFORM
Original Filed March 3, 1944     2 Sheets-Sheet 1
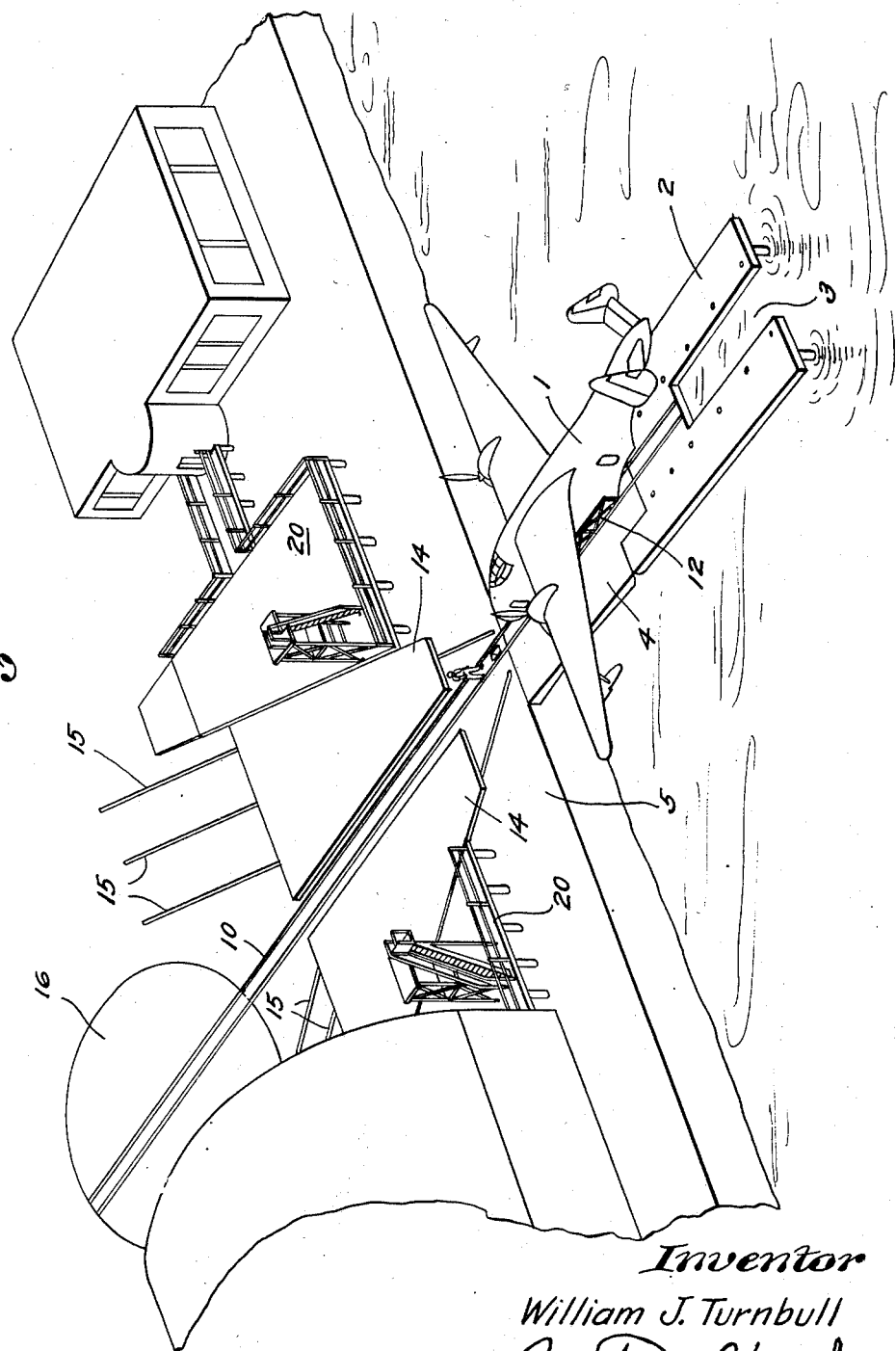
Inventor
William J. Turnbull
By  Martin E. Hogan Jr.
Attorney Feb. 20, 1951 W. J. TURNBULL 2,542,847
LOADING AND UNLOADING PLATFORM
Original Filed March 3, 1944 2 Sheets-Sheet 2
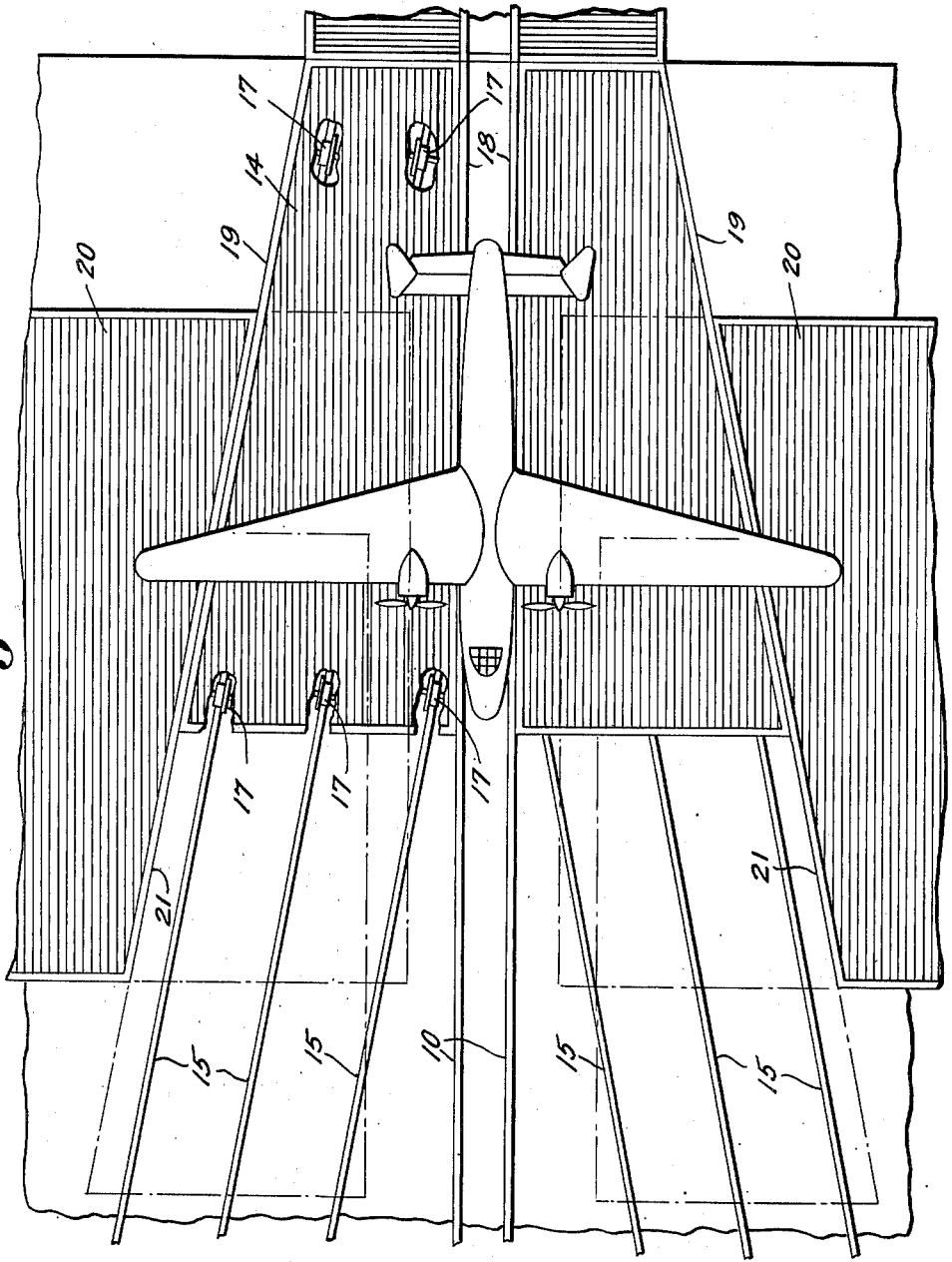
Inventor
William J. Turnbull Patented Feb. 20, 1951

2,542,847

UNITED STATES PATENT OFFICE 2,542,847

LOADING AND UNLOADING PLATFORM

William J. Turnbull, Towson, Md., assignor to The Glenn L. Martin Company, Middle River, Md., a corporation of Maryland Original application March 3, 1944, Serial No. 524,965, now Patent No. 2,381,789, dated August 7, 1945. Divided and this application June 26, 1945, Serial No. 601,571

3 Claims. (Cl. 104—31)

This invention relates to the general arrangement of structure to facilitate loading and unloading seaplanes.

This application is a division of application Serial No. 524,965, filed March 3, 1944, and since issued as Patent No. 2,381,789.

Seaplanes of the size and type illustrated in the drawings can land and take off in relatively rough water but due to the inherent structural limitations in designs of hulls of such craft, extreme care must be employed in handling such craft when docking. In still water they may be brought up and tied to a dock or float without much danger of tearing or scraping the skin. But if the water is at all rough, the difficulty increases in docking, loading and unloading the seaplane. For these reasons it is desirable to take the seaplane ashore for loading and unloading and servicing.

An object of this invention is, therefore, to provide a device readily adapted for facilitating the loading and unloading of seaplanes of various widths of hulls, while the latter are supported on suitable beaching gear.

A further object is to provide a platform structure for unloading a vehicle adapted to move along tracks, the platform structure having a fixed portion and a portion movable along a path extending laterally at an angle from the tracks, the edge of the movable portion being parallel to the tracks and the facing edges of the movable and stationary portions being parallel to the path.

Further and other objects will become apparent from the description of the accompanying drawings which form a part of this disclosure and in which like numerals refer to like parts.

In the drawings:

Figure 1 is a perspective view of a dock and related handling and servicing equipment showing the novel arrangement of loading platforms.

Figure 2 is a plan view of the seaplane ashore along side the loading platforms.

Figures 1 and 2 show a seaplane 1 mounted on a self-propelled beaching gear 12 adapted to run along tracks 10 leading from a slip 3 to a shore structure 5 and mounted partly on an adjustable dock 2, a ramp 4, and the shore structure 5. The details of the dock and ramp are fully disclosed in my above-mentioned Patent Number 2,381,789.

On the shore structure, additional trackways, each formed of parallel tracks 15, converge toward the tracks 10 on opposite sides thereof. Generally wedge-shaped movable platform sections 14 are mounted by suitable wheels 17 for travel along the tracks 15, one side 18 of each platform being parallel to tracks 10 and the generally opposite side 19 being parallel to the associated tracks 15. Immediately adjacent this latter edge of each movable platform is a fixed platform 20, the edge 21 thereof, toward the movable platform, being also parallel to tracks 15.

As clearly shown in Figures 1 and 2, the movable and fixed platforms are of substantially the same height above the shore structure 5 and have their adjacent edges maintained at such close spacing as to form at all times a substantially continuous loading platform. The height of the platform is such as to be approximately at the level of the access door in the side of the hull of a seaplane supported on the beaching gear 12. With this arrangement it can readily be seen that as the seaplane is brought ashore to a position between the movable platforms 14, these platforms may be moved adjacent the sides of the hull to facilitate loading and unloading and servicing the airplane. The separation between these movable platforms can be increased or decreased to accommodate any width flying boat hull, while still maintaining a continuity of surface between the fixed and movable platform portions. When the airplane is ready for take-off, it may be moved past the platforms to turn table 16 so that the plane may enter the water, when the dock is lowered, heading off shore so that it may proceed under its own power.

The wedged shaped loading or servicing platform eliminates ladders and gangways and the inherent accompanying hazards. The height of the platform and the proximity to the access opening in the hull will be such that passengers will step ashore onto a firm foundation and cargo will be placed ashore with equal facility.

It is to be understood that certain changes, alterations, modifications and substitutions can be made without departing from the spirit and scope of the appended claims.

I claim as my invention:

1. A loading device for a seaplane comprising a shore structure, rails on said shore structure forming a track, a cradle adapted to move on said track, said cradle formed to support a seaplane hull for transportation along said track, a platform positioned alongside said track on said shore structure having one side substantially parallel to said track and being of a height suitable for loading and unloading a seaplane supported on said cradle, said platform adapted to move on rails forming a second track at an angle to said first mentioned track, whereby the edge of said platform may be moved toward and away from the side of the seaplane hull while maintaining the substantially parallel relationship for loading and unloading.

2. A loading device for a seaplane comprising a shore structure, rails on said shore structure forming a track, a cradle adapted to move on said track, said cradle formed to support a seaplane hull for transportation along said track, a pair of platforms positioned alongside said track aligned on opposite sides thereof, each of the platforms having one side substantially parallel to said track and being of a height suitable for loading and unloading a seaplane supported on said cradle, each of said platforms adapted to move on rails forming a second track at an angle to said first mentioned track, whereby the edges of said platforms may be moved relative to said track to be positioned adjacent the sides of seaplane hulls of various widths for loading, service and repair.

3. A loading device for a wheeled vehicle adapted to move on tracks, comprising a platform having a fixed and a movable portion, said movable portion having one side thereof generally parallel to said vehicle tracks and being of a height suitable for loading and unloading said wheeled vehicle, and the other side thereof contiguous to the edge of said fixed portion inclined at an angle to said vehicle tracks so that said movable portion is generally wedge-shaped, said movable portion being mounted on wheels adapted to move on tracks arranged parallel to the edge of said fixed portion so that the movable portion can be moved toward and away from said vehicle tracks while maintaining the parallel relationship of said platform edge and said tracks.

WILLIAM J. TURNBULL.

REFERENCES CITED

The following references are of record in the file of this patent:

UNITED STATES PATENTS

| Number | Name | Date |
|---|---|---|
| 945,562 | Macartney | Jan. 4, 1910 |
| 1,149,759 | Hedley et al. | Aug. 10, 1915 |
| 1,189,669 | Davidson | July 4, 1916 |
| 1,216,560 | Gallinant | Feb. 20, 1917 |